May 3, 1938.  K. PAPELLO  2,116,323
CAMOID GEARING
Filed Nov. 10, 1937
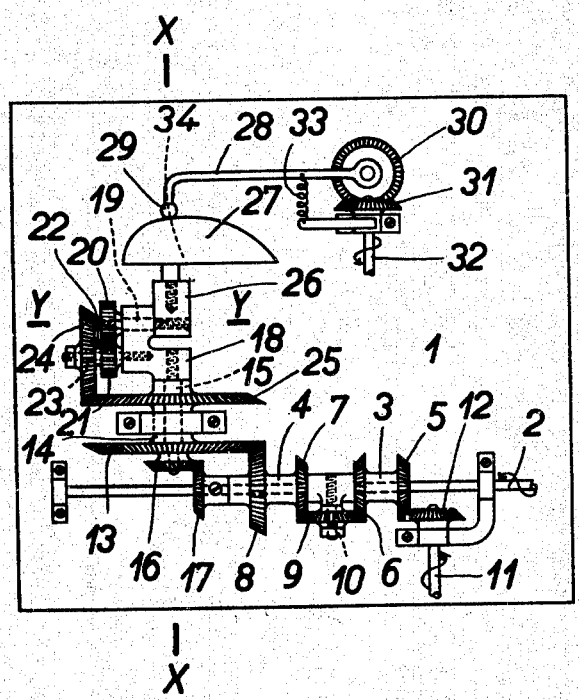
Inventor:
Karl Papello Patented May 3, 1938

2,116,323

UNITED STATES PATENT OFFICE 2,116,323

CAMOID GEARING

Karl Papello, Jena, Germany, assignor to the firm of Carl Zeiss, Jena, Germany

Application November 10, 1937, Serial No. 173,876
In Germany November 27, 1936

4 Claims. (Cl. 74—1)

This application has been filed in Germany, November 27, 1936.

The invention concerns a camoid gearing having a camoid which effects two movements and so controls a feeler movable in one direction as to displace this feeler according to a function the two variables of which determine the form of the camoid.

The invention provides rotations of the camoid about two axes and thus avoids the gliding friction inherent in the known camoid gearings, in which the camoid is rotatable about one axis and displaceable along this axis. The said advantage makes it possible for practically the first time to connect in calculating apparatus a great number of camoid gearings immediately behind each other, a further improvement being highly increased economy of space.

The two axes of rotation of the camoid are conveniently at right angles to each other.

The accompanying drawing which illustrates the invention, shows in plan-sectional view a constructional example of a camoid gearing in which the two axes of rotation of the camoid intersect each other at right angles.

A shaft 2 is rotatably mounted on a base plate 1 and supports two loosely rotatable bearing bodies 3 and 4 fast with bevel gear wheels 5, 6 and 7, 8, respectively. The bevel gear wheels 6 and 7 are the two crown wheels of a differential gear whose planet wheel 9 is loosely rotatable about a pin 10 which is so fixed to the shaft 2 that its axis intersects that of this shaft 2 at right angles. The bevel gear wheel 5 is in mesh with a bevel gear wheel 12 fast with a shaft 11, and the bevel gear wheel 8 meshes with a bevel gear wheel 13 of a bearing body 14 so mounted on the base plate 1 as to be loosely rotatable about an axis X—X intersecting at right angles the axis of the shaft 2. In an axial bore in the bearing body 14 is loosely rotatable a shaft 15 to which is screwed a bevel gear wheel 16 in mesh with a bevel gear wheel 17 fast with the shaft 2. To the shaft 15 is screwed a bracket 18, in which a shaft 19 is mounted for rotation about an axis Y—Y intersecting the axis X—X at right angles. The shaft 19 is actuated as follows: A spur gear wheel 20 screwed to the shaft 19 is in mesh with a spur gear wheel 21 of a bearing body 22 loosely rotatable about a pin 23 fast with the bracket 18. A bevel gear wheel 24 of the bearing body 22 is in mesh with a bevel gear wheel 25 of the bearing body 14. To the shaft 19 is screwed an arm 26 to which is fixed a camoid 27. On the base plate 1 is rotatable an arm 28, which terminates in a spherical feeler 29. To the arm 28 is fixed a bevel gear wheel 30 in mesh with a bevel gear wheel 31 fast with a shaft 32 rotatably mounted on the base plate 1. By means of a spring 33, the feeler 29 is continuously kept in contact with the surface of the camoid 27.

The surface of the camoid 27 is so shaped that the movements of the feeler 29 correspond to a definite function of the angle of rotation of the shaft 2 and the angle of rotation of the shaft 11, the rise of the arc 34 described by the feeler 29 being considered.

The above-described arrangement avoids that a rotation of the camoid 27 about the axis X—X, which is due to a rotation of the shaft 2, entails a rotation of this camoid 27 about the axis Y—Y. The run-back differential gear 6, 7, 9 provided to this effect can be dispensed with when the running-back is taken into consideration in the form of the camoid 27.

When the apparatus is in use, the two shafts 2 and 11 are to be rotated according to the two variables of the function underlying the form of the camoid 27, in which case the shaft 32 rotates continuously according to the sought function.

I claim:

1. Camoid gearing, comprising a camoid rotatable about two axes, a feeler displaceably disposed, and means for guiding the feeler along a predetermined path, the feeler being in contact with the camoid.

2. Camoid gearing, comprising a camoid rotatable about two axes, a feeler displaceably disposed, means for guiding the feeler along a predetermined path and means for keeping the feeler in contact with the camoid.

3. Camoid gearing, comprising a camoid rotatable about two axes at right angles to each other, a feeler displaceably disposed, and means for guiding the feeler along a predetermined path, the feeler being in contact with the camoid.

4. Camoid gearing, comprising a camoid rotatable about two axes, a feeler rotatable about an axis, the feeler being in contact with the camoid.

KARL PAPELLO.